United States Patent
Doty et al.

(10) Patent No.: US 8,082,344 B2
(45) Date of Patent: Dec. 20, 2011

(54) TRANSACTION MANAGER VIRTUALIZATION

(75) Inventors: John D. Doty, Seattle, WA (US); James E. Johnson, Bellevue, WA (US); William James Carley, Woodinville, WA (US); Kapil Gupta, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1148 days.

(21) Appl. No.: 11/673,749

(22) Filed: Feb. 12, 2007

(65) Prior Publication Data

US 2008/0196029 A1  Aug. 14, 2008

(51) Int. Cl.
*G06F 15/173* (2006.01)
(52) U.S. Cl. ..................... 709/226; 709/221
(58) Field of Classification Search .................. 709/228, 709/226, 221
See application file for complete search history.

(56) References Cited

U.S. PATENT DOCUMENTS

| | | | |
|---|---|---|---|
| 6,779,017 B1* | 8/2004 | Lamberton et al. | 709/203 |
| 6,934,755 B1 | 8/2005 | Saulpaugh et al. | |
| 7,035,921 B1* | 4/2006 | Baker | 709/224 |
| 7,533,080 B2 | 5/2009 | Groff et al. | 707/2 |
| 2003/0145013 A1* | 7/2003 | Kovarik et al. | 707/100 |
| 2003/0163755 A1* | 8/2003 | Fung et al. | 714/4 |
| 2005/0120160 A1 | 6/2005 | Plouffe et al. | |
| 2005/0144299 A1* | 6/2005 | Blevins et al. | 709/230 |
| 2005/0192969 A1* | 9/2005 | Haga et al. | 707/10 |
| 2006/0143495 A1* | 6/2006 | Bozak et al. | 714/4 |
| 2006/0271395 A1 | 11/2006 | Harris et al. | |
| 2007/0067435 A1 | 3/2007 | Landis et al. | |
| 2007/0209042 A1* | 9/2007 | Mullan et al. | 719/328 |
| 2009/0070760 A1 | 3/2009 | Khatri et al. | |
| 2009/0089787 A1 | 4/2009 | Giles et al. | |
| 2009/0276364 A1* | 11/2009 | Iaia et al. | 705/80 |

OTHER PUBLICATIONS

Iana. "Port Numbers". May 15, 2001.*
Kumar et al. Performance Considerations for an Operating System Transaction Manager. Jun. 1989.*
"How to Configure Multiple Instances of Distributed Transaction Coordinator (DTC) on a Windows Server Failover Cluster 2008," http://blogs.technet.com/askcore/archive/2009/02/18/how-to-configure-multiple-instances-of-distributed-transaction-coordinator-dtc-on-a-windows-server-failover-cluster-2008.aspx, pp. 1-22 (Copyright 2009).
"HP NonStop server virtualization primer," http://209.85.229.132/search?q=cache:OtdXoQb8FfYJ:h71028.www7.hp.com/ERC/downloads/4AA0-3156ENW.pdf+transaction+managment+virtualization+%2B+resource+%2B+clusters&cd=2&hl=en&ct=clnk&gl=uk, pp. 1-27 (Copyright 2006).
"Moab Utility/Hosting Suite™,"http://www.clusterresources.com/products/moab-utilityhosting-suite.php, pp. 1-4 (Copyright 2009).
Harzog, B., "Virtualization Management: VMware B-hive Detailed Product Review," pp. 1-11, http://www.dabcc.com/article.aspx?id=7988 (Jun. 18, 2008).
Tal, M. "How to maximize performance in virtualized environments," *ZDNet News*, http://news.zdnet.com/2100-9595_22-207242.html, pp. 1-6 (Jun. 19, 2008).

* cited by examiner

*Primary Examiner* — Ajay Bhatia
*Assistant Examiner* — Bryan Lee
(74) *Attorney, Agent, or Firm* — Merchant & Gould (57) ABSTRACT

A transaction manager virtualization layer is provided for supporting multiple active transaction managers in a cluster or node. By virtualizing the transaction managers, applications and services are enabled to migrate across cluster nodes or even outside a cluster that includes relevant recovery mechanisms for transactions that are not completed at the time of migration. Multiple implementations of a transaction manager may be enabled to run side-by-side in a node or cluster allowing a rolling upgrade of transaction managers in clusters.

17 Claims, 7 Drawing Sheets

TRANSACTION MANAGER VIRTUALIZATION

RELATED APPLICATIONS

This application is related to U.S. Pat. No. 7,533,080, issued May 12, 2009, and entitled, "COMMIT TREE OPTIMIZATION BASED ON RECOVERY TOPOLOGY INFORMATION," which is hereby incorporated by reference.

BACKGROUND

Transactions are an essential element for building reliable applications. When applications involve multiple, distributed subsystems or when applications are composed of multiple, independent components, transactions help an application to cleanly deal with failures in one of the distinct pieces. As one example, large-scale, connected e-commerce applications typically employ transactions for order processing.

Clusters are groups of loosely coupled physical or virtual computing devices (or nodes) that work together closely so that in many respects they can be viewed as though they are a single computing device. The components of a cluster are commonly, but not always, connected to each other through fast local area networks. Clusters are usually deployed to improve performance and/or availability over that provided by a single node, while typically being much more cost-effective than single computers of comparable speed or availability.

Transaction managers running in a cluster may have functional constraints such as one active transaction manager at one time in each cluster, configuration of the transaction manager being tightly coupled with the specific cluster such that moving a node inside or outside the cluster requires a full rebuild of the operating system/machine configuration, and difficulty of preserving data integrity when resources migrate from a cluster or the cluster itself fails over to a different node. If the transaction manager log contains unresolved transactions that need to be recovered at the moment of the failover, the data may become unrecoverably corrupted after the migration to the new node.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing a transaction manager virtualization layer capable of supporting multiple active transaction managers in a cluster or node. Transaction and resource managers, as well as nodes, are enabled to migrate across clusters or even outside a cluster that includes relevant recovery mechanisms for transactions that are not completed at the time of migration. Multiple implementations of a transaction manager may be enabled to run side-by-side in a node or cluster allowing a rolling upgrade for the clusters.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, a transaction manager virtualization layer capable of supporting multiple active transaction managers in a cluster or node is provided. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
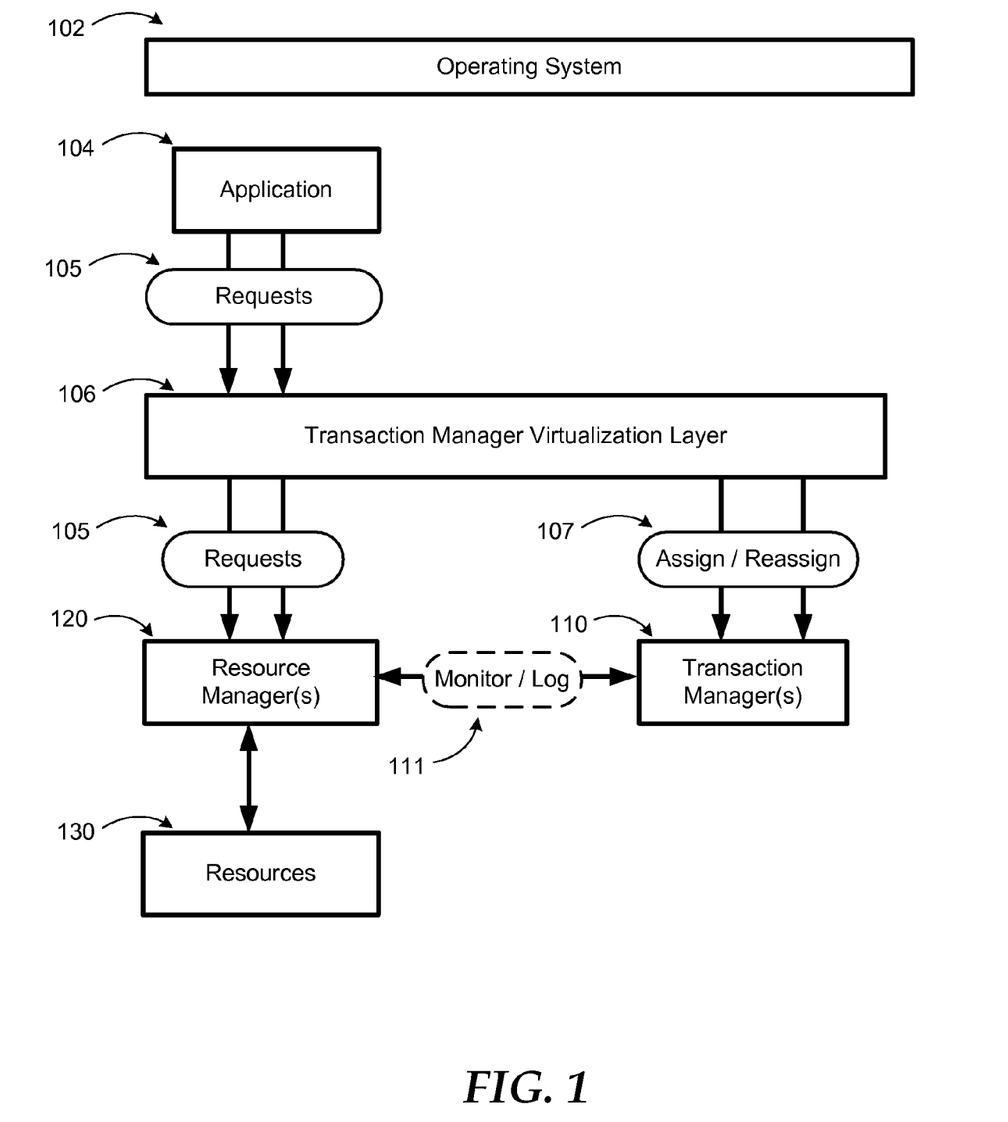
FIG. 1 illustrates an example transaction manager virtualization architecture.

Referring to FIG. 1, an example transaction manager virtualization architecture is illustrated. Transaction management provides tools to ease or automate application programming, execution, and administration of complex, distributed applications. Transaction management systems typically support a network of devices that submit queries and updates to a resource in the network. Based on these inputs, the resource may maintain a database representing some real-world state. Resource responses and outputs may in turn drive real-world actuators and transducers that alter or control the state.

Applications, databases, and networks tend to evolve over time. Increasingly, the systems are geographically distributed, heterogeneous (i.e. they involve equipment and software from many different vendors), continuously available (i.e. there is no scheduled downtime), and have stringent response time requirements.

In addition to the limitations described previously, the fact that only one transaction manager can be active at one time in the cluster, introduces a considerable bottleneck in performance, especially when other cluster resources (e.g. database servers) are running on a different node than the one where the transaction manager is active. If the only available transaction manager is failing-over to a different node or recovering from a crash, all resources waiting on transactional services may be blocked until the transaction manager is back online. Due to these limitations a "rolling-upgrade" of the cluster, where each node is upgraded while the cluster remains active may not be allowed.

According to some embodiments, a virtualization layer is introduced between the client (the application requesting transactional services) and the actual transaction manager instance, which coordinates the transaction. The transaction manager virtualization layer enables creation of multiple transaction managers within a group of applications scattered around multiple computers and choosing of a proper transaction manager through this abstraction layer using an automatic heuristic model.

The transaction manager selection logic may be based on resource manager and resource manager location or configuration. An override option in the transaction manager selection logic may also be provided for applications to indicate a specific transaction manager to map the network topology, perhaps a transaction manager physically closer to the application to achieve better application performance.

A need to perform specific configuration for enabling transaction coordination in a clustered environment by allowing multiple transaction manager instances to coexist in a resource group is thereby eliminated. Potential problems associated with data integration, mentioned earlier, are also substantially reduced by allowing the transaction coordination ownership to move from one transaction manager to another when needed.

Referring back to FIG. 1, transaction manager virtualization layer 106 operates under operating system 102 monitoring requests 105 from client applications (e.g. application 104). Transaction manager virtualization layer 106 assigns and reassigns (107) transaction manager(s) 110 to application 104 as conditions in the cluster change without the application being affected by the changes. A selection algorithm for assigning transaction managers is discussed in more detail below.

Requests 105 are forwarded to resource manager(s) 120. A transactional system comes with an array of transactional resource managers that provide operations on the objects they implement. Database systems, persistent programming languages, and queue managers are typical examples. In such as system, resource manager(s) 120 provide resource (130) services employing "ACID" properties. ACID properties include: Atomicity—all changes performed as part of the transaction happen, or none of them happen; Consistency— data is transformed from one correct state to another; Isolation—multiple concurrent updaters are prevented from interfering with one another; and Durability—committed changes remain permanent, even in the face of failures. Transaction manager(s) 110 monitor and log resource manager activities.

Figure 2:
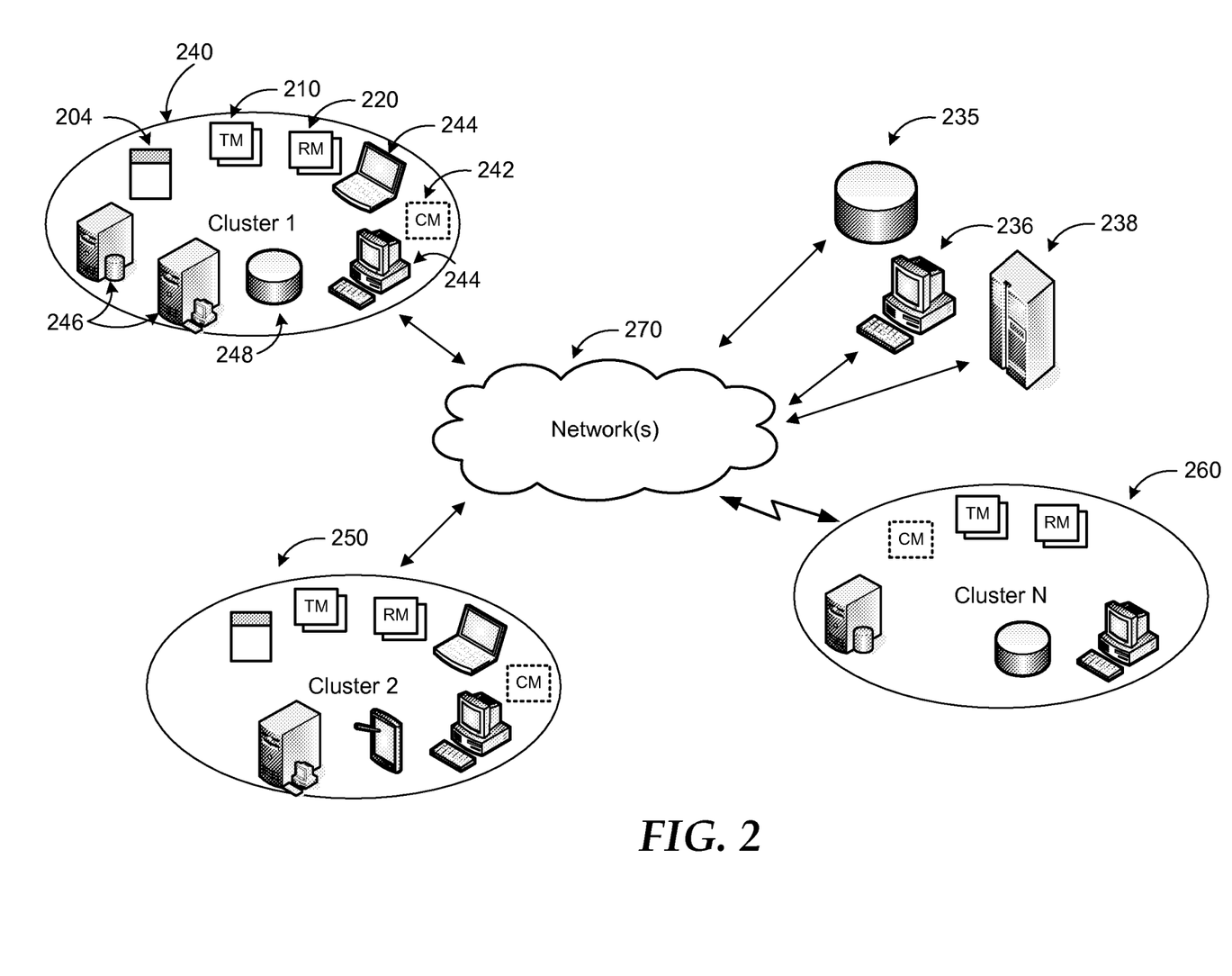
FIG. 2 illustrates a networked environment of multiple clusters where embodiments may be implemented.

FIG. 2 illustrates a networked environment of multiple clusters where embodiments may be implemented. A cluster resource group is a collection of applications, services, and data resources operating together as a single computing entity. A cluster resource group is typically associated with a virtual network name and an IP address, which makes up a clustered service. Clients intending to use the clustered service may refer to the virtual name and the IP address to communicate with the service. The clustered service can be configured to run on a cluster of multiple machines (nodes).

In a typical operation, a clustered service application is active on only one node at a given time, meaning it assumes the responsibility of running a resource to answer incoming client requests. If the active node experiences a catastrophic failure (memory failure, power outage etc), or a planned shutdown, one of the other nodes in the cluster may assume the ownership for executing the resources. This referred to as "cluster failover". When the new node picks up the execution responsibility all relevant resource data from the failed node must be carried over or migrated to the new node to guarantee uninterrupted service and prevent data loss. From clients perspective the service name and address remains the same. The reverse of this process is called "failback" and it occurs when the failed node comes back online. The same availability and data integrity requirements as in failover apply to failback process.

Additionally, one or more of the resources in a clustered resource group or a physical node may be taken out of the cluster, or an external resource or a new node may be moved in to the cluster at a given time. This operation requires the remaining resources in the clustered resource group to start/stop functioning with the new resource or node without interrupting the service availability or causing any data loss.

Transaction managers maintain a private log (TM log) to keep track of active transaction states. When a failover or failback occurs this log needs to be migrated to the new active node. A distributed transaction coordinator service providing transaction manager virtualization may operate as a system service as part of the operating system such as WINDOWS® operating system of MICROSOFT CORP. of Redmond, Wash.

Such a distributed transaction coordinator service may have core data associated with it such as: a Contact ID (CID) for the service, a log location, a log size, a set of security settings, a hostname, and the like. This information may be stored in an operating system registry. A client application that wants to communicate with a transaction manager may call the Application Programming Interfaces (APIs) provided in an associated proxy Dynamic Library Link (DLL). The proxy implementation may start reading the data mentioned above from the registry in order to be able to contact the correct transaction manager. By default the CID may point to the local transaction manager, the transaction manager which was installed on the computer during the operating system setup. The local transaction manager may be enabled or disabled by an administrator at configuration time.

As described previously, a layer of virtualization is provided for multiple transaction manager support. The settings (and their locations and formats) associated with a transaction manager instance are abstracted by the virtualization layer from the client (proxy) by using a common interface. For each type of transaction manager, there may be a different implementation of the common interface: one for local transaction manager, one for the remote-proxy transaction manager (where the application, hence the proxy, is remote to the node where the transaction manager coordinating the transaction is running), one for cluster-resources, and the like. When a client wants to talk to the transaction manager, the proxy may use the before mentioned transaction manager selection algorithm to instantiate the corresponding common interface and connect to the transaction manager. The virtualization layer keeps away from the client the details of implementation for each transaction manager type, and also provides a unified way to communicate with each transaction manager. In addition to the common interface, the registry settings associated with a transaction manager may also be stored in a separate key. This separation further allows multiple versions of the transaction manager to be active on the same node, since side-by-side instances can be seen as just another configuration.

According to other embodiments, a backward compatibility with clients that do not have a proxy capable of communicating with a "virtualized" operating system may be provided by maintaining the old structure for the registry settings and redirecting them to a "default" transaction manager. The default transaction manager plays a significant role in a cluster when multiple clustered resources exist. An administrator of the cluster may select which clustered transaction clustered service is the "default".

The above described aspects are illustrated in FIG. 2 as three differently configured clusters and some independent resources. As mentioned previously, multiple transaction managers or different versions (implementations) of the same transaction manager may provide services to applications for resources within the same cluster or in other clusters. Each cluster in a complex system may be configured differently with dissimilar nodes. Nodes (as well as transaction and resource managers) may communicate over one or more networks 270.

Such a system may comprise any topology of servers, clients, Internet service providers, and communication media. Also, the system may have a static or dynamic topology. The term "client" may refer to a client application or a client device. While a networked system implementing transaction manager virtualization architecture may involve many more components, relevant ones are discussed in conjunction with this figure.

Network(s) 270 may include a secure network such as an enterprise network, an unsecure network such as a wireless open network, or the Internet. Network(s) 270 provide communication between the nodes described herein. By way of example, and not limitation, network(s) 270 may include wired media such as a wired network or direct-wired connection, and wireless media such as acoustic, RF, infrared and other wireless media.

Many other configurations of computing devices, applications, data sources, data distribution systems may be employed to implement providing transaction manager virtualization. Furthermore, the networked environments discussed in FIG. 2 are for illustration purposes only. Embodiments are not limited to the example applications, modules, or processes.

Cluster 1 (240) includes application 204, transaction managers 210, resource managers 220, client devices 244, servers 246, and data store 248. Transaction managers 210 and resource managers 220 may communicate with transaction managers and resource managers in other clusters through communication manager 242.

In a multi cluster system, a transaction manager may be assigned to an application in the same cluster (local) or in a different cluster (remote) to manage transactions with local or remote resources. Furthermore, the assigned transaction manager may be reassigned based on network, cluster, or node conditions (e.g. load, an element going offline, and the like). To illustrate that point, cluster 2 (250) does not include a database server or a data store as local resources, while it includes a local application, transaction managers, and resource managers. Cluster N (260) does not include a local application or a management server. Thus, the transaction manager of cluster N is arranged to provide services to remote applications for access to local or remote resources. Cluster N (260) is shown communicating with other clusters using wireless communication. Furthermore, applications within the system may request access to resources that are not part of a cluster (e.g. data store 235, client device 236, and server 238).

Figure 3:
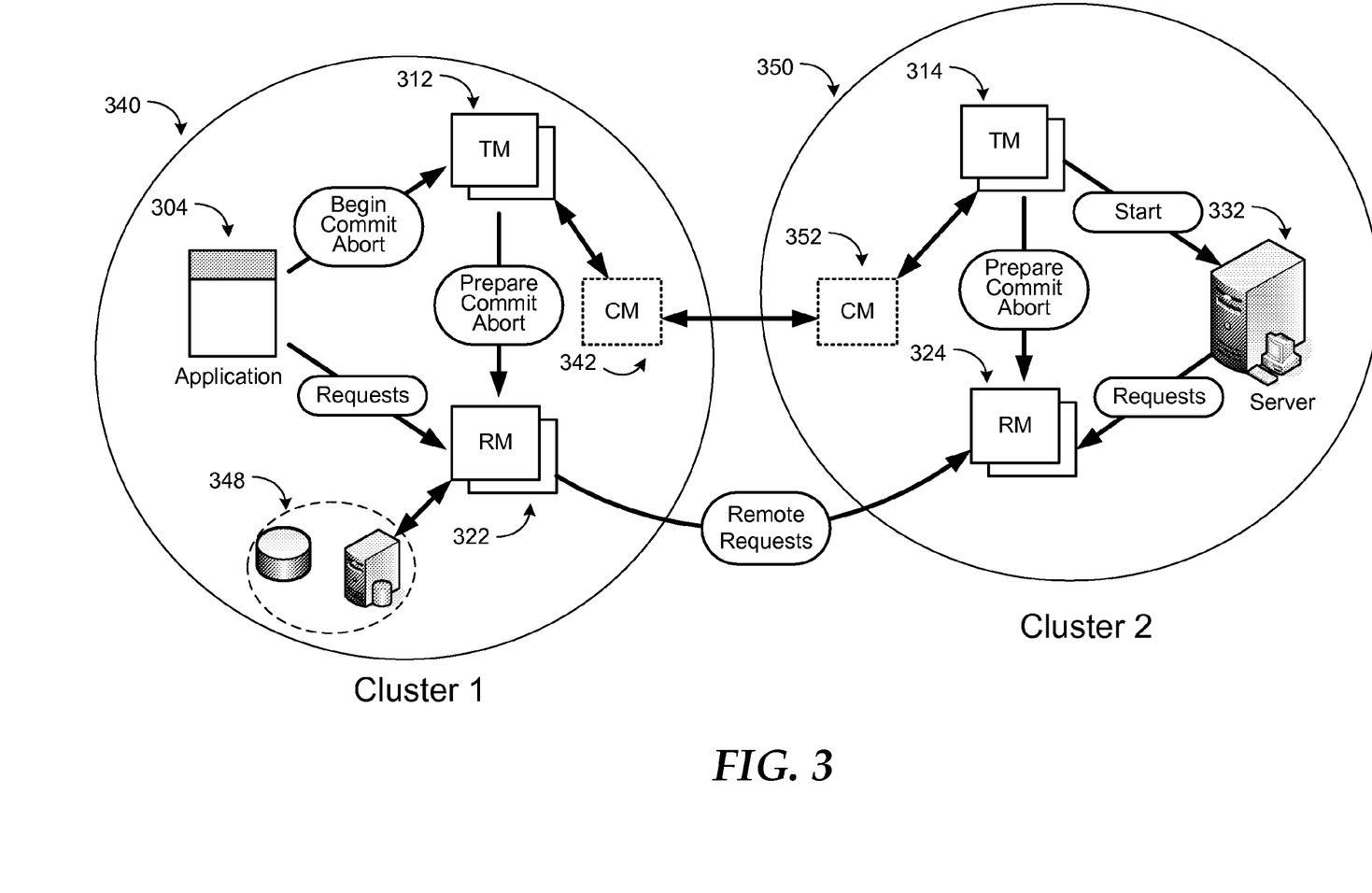
FIG. 3 illustrates a more detailed diagram of using multiple transaction managers in a two-cluster system.

FIG. 3 illustrates a more detailed diagram of using multiple transaction managers in a two-cluster system. Each of the clusters 1 and 2 (340 and 350) may include multiple transaction managers (312, 314). Furthermore, resources in either one of the clusters may be used by applications in other clusters managed by transaction managers 312, 314, or others.

During an operation according to embodiments, application 304 does not need to know which transaction manager to contact. The transaction manager virtualization layer, which may be an integral part of the operating system, determines a transaction manager to assign to the application after receiving the request. The determination may be based on availability, load levels, local vs. remote preference, or by administrator configuration. The determination may also be made using a heuristic algorithm.

Resource manager(s) 322 receive the request(s) from application 304 and provide access to the requested resource, which may be local or remote. For example, the requested resource may be a database service (348) comprising a data store and associated server. Remote resource requests may be forwarded by local resource manager 322 to remote resource manager 324 in cluster 2, which in turn uses server 322 to provide the resource.

Local and remote transaction managers (312, 314) may communicate through optional communication managers 342, 352 and hand over applications if a node or the application itself migrates. By enabling a distributed assignment of transaction managers to applications and multiple instances of transaction managers in a cluster, efficiency of transaction management can be increased, because a number of factors such as load balancing, availability, network conditions, and so on can be considered in assigning transaction managers. Moreover, transaction manager assignments can be changed dynamically and transparently to the application when conditions change (e.g. a node migrating or going offline). The ability to switch transaction managers between clusters in a transparent manner to the application is significant, because it provides a flexible platform for recovery mechanisms.

If a cluster or a node goes offline (e.g. software upgrade) in a system, transaction managers in that cluster may be migrated to other clusters. This in turn enables implementation of recovery mechanisms for transaction that were not completed at the time of migration. In addition, rolling upgrades of clusters may be performed by utilizing side-by-side implementations of transaction (and resource) managers.

Figure 4:
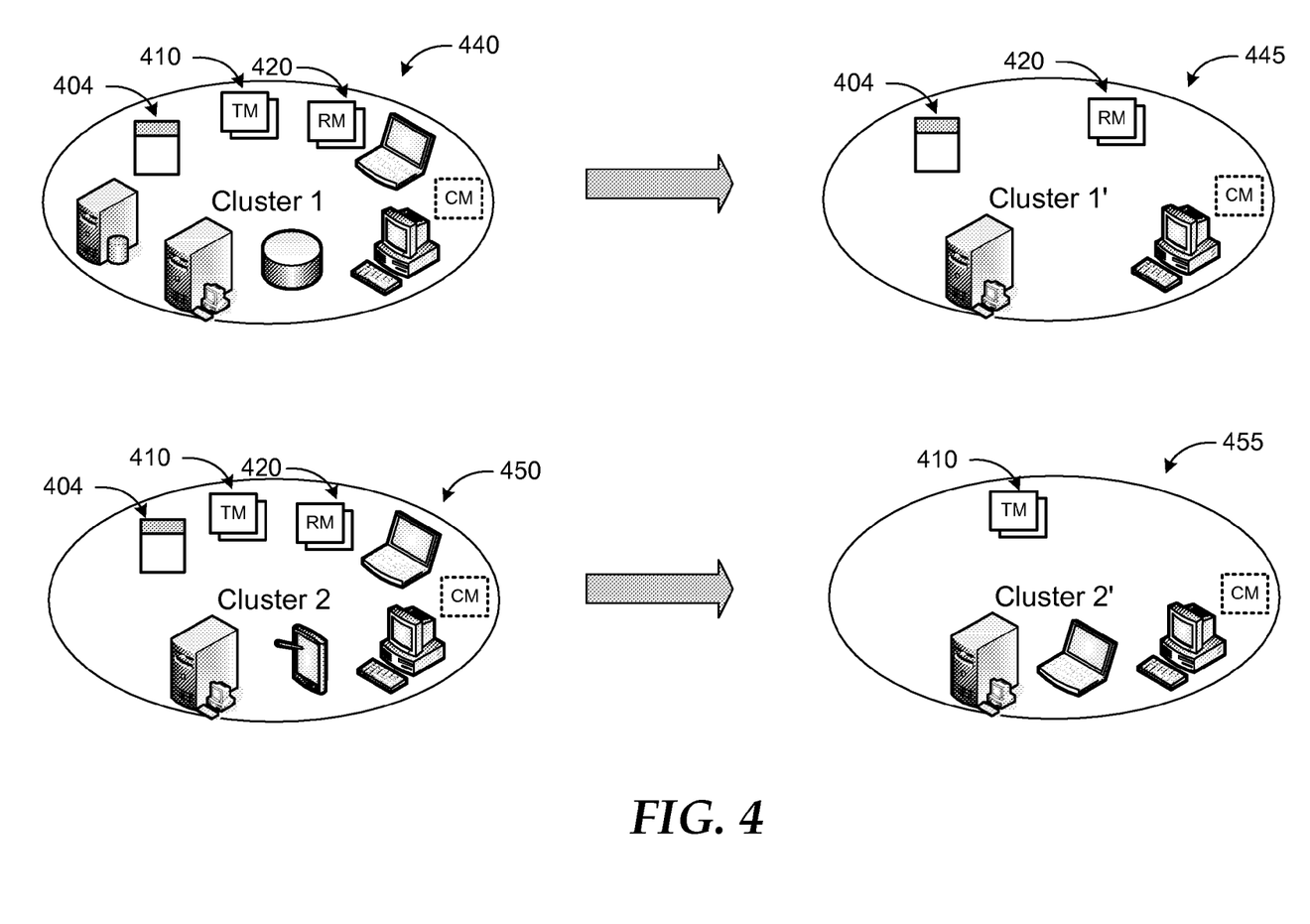
FIG. 4 illustrates migration examples of cluster elements in a system employing transaction manager virtualization.

FIG. 4 illustrates migration examples of cluster elements in a system employing transaction manager virtualization. Two example scenarios are shown in the figure.

According to the first scenario, Cluster 1 (440) includes application 404, local transaction manager(s) 410, resource manager(s) 420, and various resources within the cluster. Cluster 1' (445) is the same cluster after changes have taken place. Some of the resources may have left the cluster (offline, migrated to another cluster, and the like), transaction manager(s) 410 may no longer exist as a local transaction manager in the cluster. In such a scenario, local application 404 may be assigned a remote transaction manager for managing its access to resource within the cluster or in other clusters.

According to the second scenario, cluster 2 (450) includes similar elements as in cluster 1 such as local transaction manager(s) 410, resource manager(s) 420, and resources that may be different from cluster 1. After the change event, some of the existing resources may leave the cluster; new resources may join; resource manager(s) may no longer exits; and even the application may migrate to another cluster. In this case, the still existing transaction manager(s) 410 in cluster 2' (455) may provide transaction management services to applications in other clusters as remote transaction manager(s).

Figure 5:
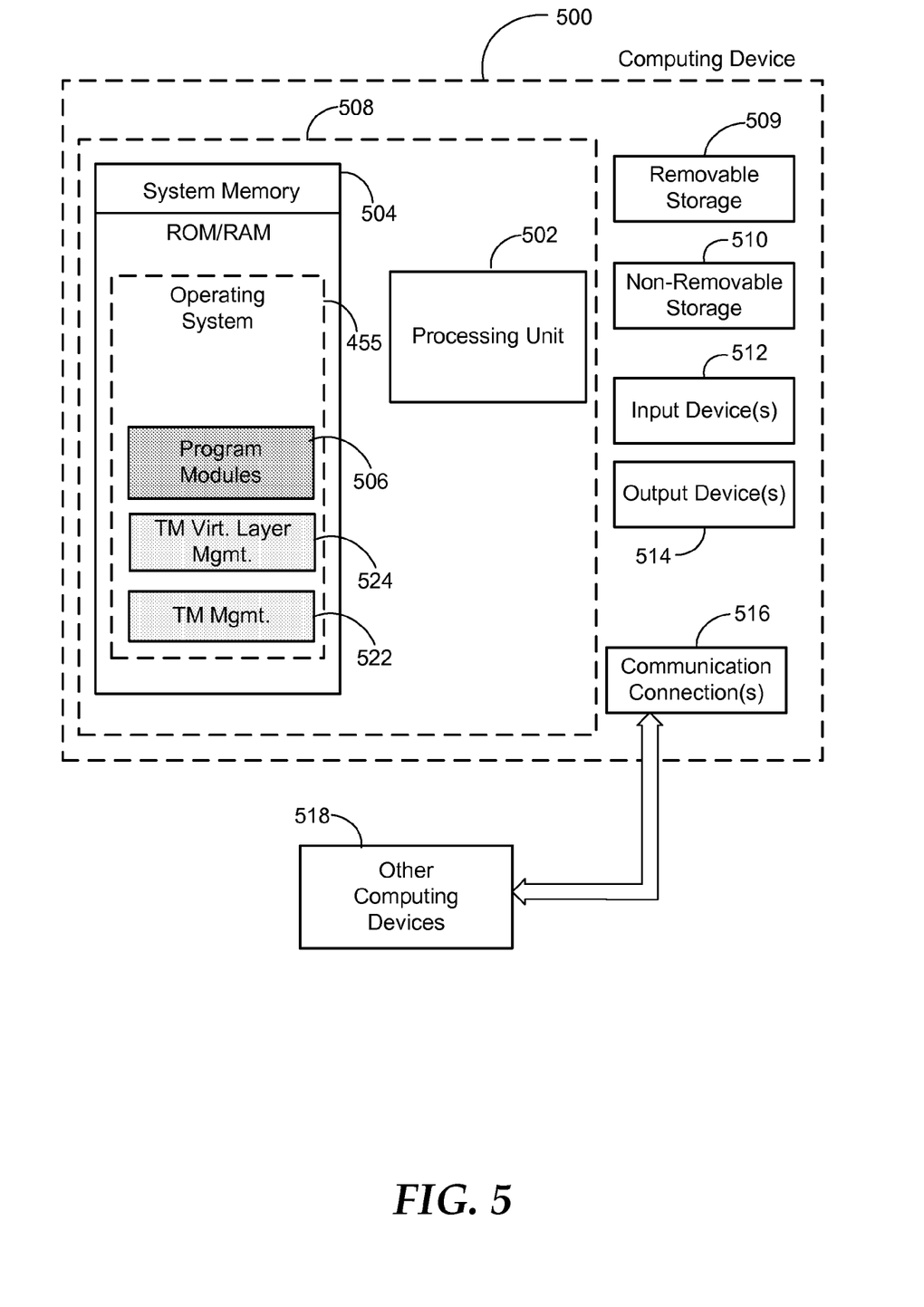
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a server providing transaction management services (e.g. as part of the operating system), and typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of a networked personal computer, such as the WINDOWS®operating systems from MICROSOFT CORPORATION of Redmond, Wash. The system memory 504 may also include one or more software applications such as program modules 506, transaction manager engine 522, and transaction manager virtualization layer engine 524.

Transaction manager engine 522 may be an application or an integral module of operating system 505 that provides transaction management services to applications associated with computing device 500. Transaction manager virtualization layer engine 524 may manage transaction managers enabling use of multiple transaction managers across clusters as described previously. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 505 and non-removable storage 510. Computer storage media may include volatile and non-volatile, removable and non-removable media implemented in any method or technology for storage of information, such as computer readable instructions, data structures, program modules, or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
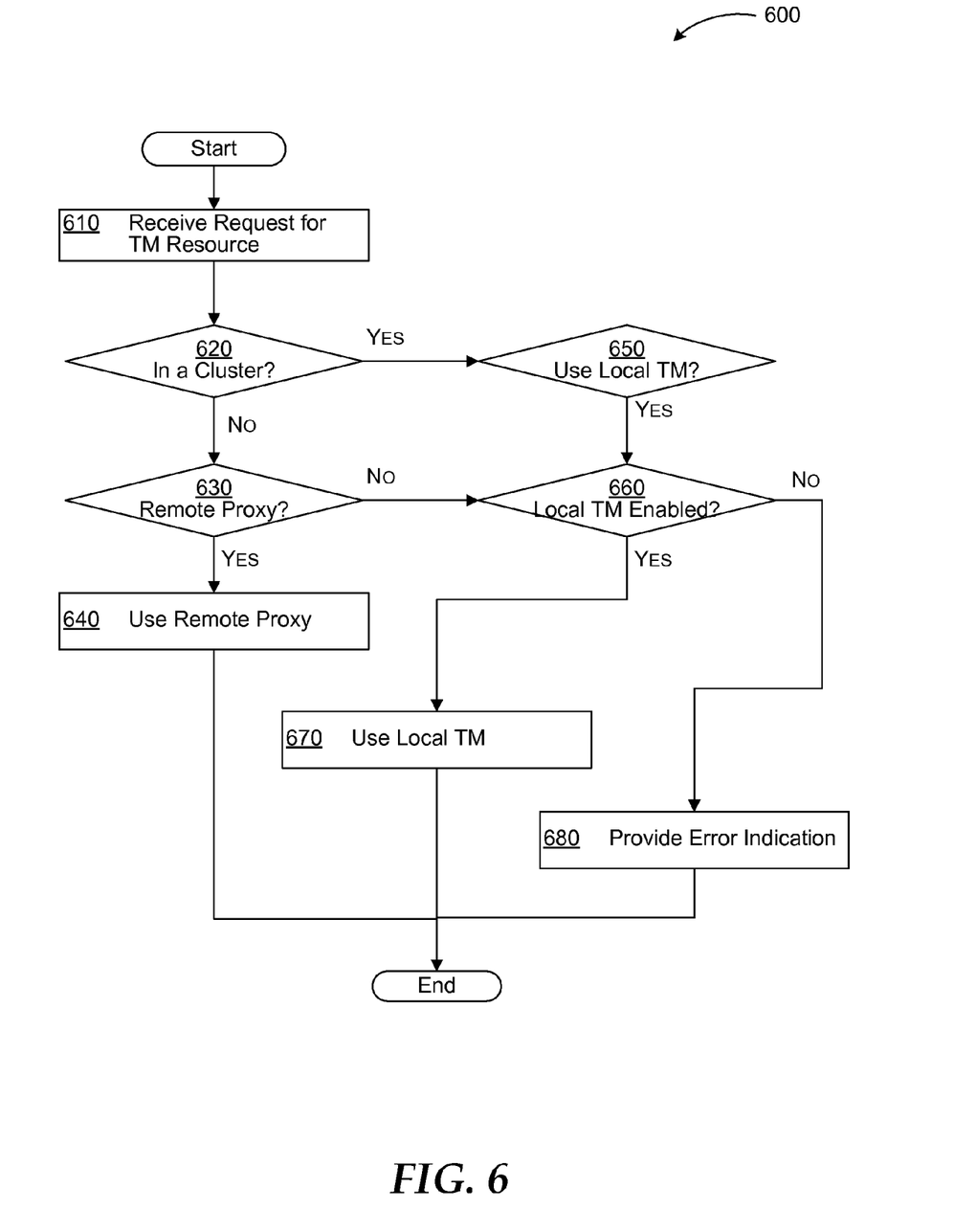
FIG. 6 illustrates a logic flow diagram for a process of determining and using transaction managers in a transaction manager virtualization architecture.

FIG. 6 illustrates a logic flow diagram for a process of determining and using transaction managers in a transaction manager virtualization architecture. Process 600 may be implemented as part of an operating system shared by clusters.

Process 600 begins with operation 610, where a request for a transaction manager is received from an application. Processing advances from operation 610 to decision operation 620.

At decision operation 620, a determination is made whether the requesting application is part of a cluster. If the application is part of a cluster, processing continues to decision operation 650. Otherwise, processing moves to decision operation 630.

At decision operation 630, a determination is made whether the requesting application is requesting a remote proxy. If the application is requesting a remote proxy, processing continues to operation 640, where the remote proxy is used for the request. Following operation 640, processing moves to a calling process for further actions. If a remote proxy is not requested, processing moves to decision operation 660.

Returning to decision operation 650, a determination is made whether a local transaction manager is to be used. If the local transaction manager is to be used, processing advances to decision operation 660 as well.

At decision operation 660, a determination is made whether the local transaction manager is enabled. If the local transaction manager is enabled, processing continues to operation 670, where the local transaction manager is assigned to the requesting application, after which processing moves to a calling process for further actions. If the local transaction manager is not enabled, processing moves to operation 680, where an error indication may be provided to the requesting application. After operation 680, processing also moves to a calling process for further actions.

Figure 7:
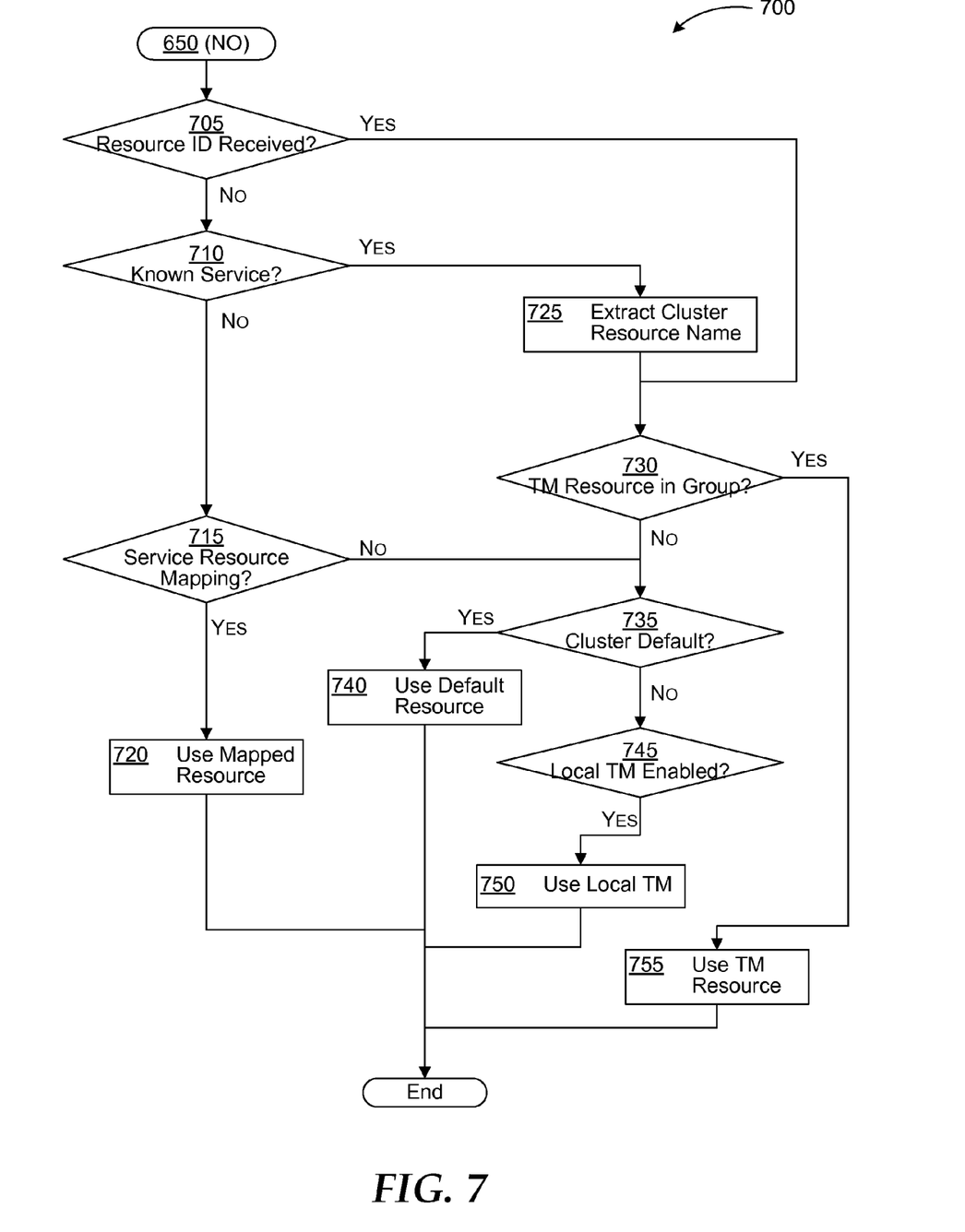
FIG. 7 illustrates a logic flow diagram for an alternative process of determining and using transaction managers in a transaction manager virtualization architecture.

FIG. 7 illustrates a logic flow diagram for an alternative process of determining and using transaction managers in a transaction manager virtualization architecture. Process 700 begins with decision operation 705 following a negative determination at decision operation 650 of process 600.

At decision operation 705, a determination is made whether a resource ID is received from the requesting application. If the resource ID is received, processing advances to decision operation 730. If no resource ID is received, processing moves to decision operation 710.

At decision operation 710, a determination is made whether a known service is requested. If a known service is requested, processing advances to operation 725, where the cluster resource name is extracted from a database of known resource services. After operation 725, processing also moves to decision operation 730.

If the determination at decision operation 710 is that the requested service is not a known one, processing advances to decision operation 715. At decision operation 715, a determination is made whether a mapping to the service resource exists.

The mapping may be implemented using a configuration key that associates service names and .exe to transaction manager instance names (.exe mapping is not shown in the flowchart for space saving). Administrators may use this key mapping for application compatibility purposes, so that old applications and services can take advantage of this mapping capability. New applications and services may pass in a resource identifier while requesting the proxy interface, or use this mapping capability through configuration. Non-clustered applications using resources in a cluster can also make use of this transaction manager selection heuristic by providing an existing resource ID.

With multiple transaction manager instances existing at the same time and potential change of the selection mechanism over time (e.g. by an administrator), the recovery mechanism may be modified by augmenting the prepare info for each transaction with enough information to reestablish communications with the appropriate transaction manager.

The virtualization architecture further provides an easy extensibility model, because the changes to the transaction managers are abstracted from the client side. For example, the abstraction layer of the common interface may enable an easy "upgrade" and/or "promote" process for the transaction managers without changing the client, similar to the abstraction of the lightweight transaction managers.

If the determination at decision operation 715 is that the mapping to the service resource exists, processing proceeds to operation 720, where the mapped resource is used. After operation 720, processing moves to a calling process for further actions. If the determination at decision operation 715 is a negative one, processing advances to decision operation 735.

Returning to decision operation 730, a determination is made whether a clustered transaction manager resource is in the group of clusters. Such a resource may be designated by the requested resource ID or determination of a known service name as described in preceding operations. If the resource is in the group, processing moves to operation 755, where the clustered transaction manager resource is used. After operation 755, processing moves to a calling process for further actions.

If no clustered transaction manager resource is found in the group, processing moves to decision operation 735, where a determination is made whether a cluster default resource exists. If the cluster default resource exists, processing advances to operation 740, where the default resource is used. After operation 740, processing moves to a calling process for further actions.

If no cluster default transaction manager exists, processing moves from decision operation 735 to decision operation 745, where a determination is made whether the local transaction manager is enabled. If the local transaction manager is enabled, processing advances to operation 750, where the local transaction manager is used. After operation 750, processing moves to a calling process for further actions. If the local transaction manager is not enabled, an error message may be sent to the requesting application (not shown).

The operations included in processes 600 and 700 are for illustration purposes. Transaction manager virtualization may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing virtualized transaction management in a clustered system, the method comprising:
   receiving a request for a transaction manager resource from an application;
   assigning the application a transaction manager resource, wherein each cluster of the clustered system includes at least one transaction manager resource;
   determining the requested transaction manager resource;
   enabling use of the requested transaction manager resource by the application;
   providing transaction management services through the assigned transaction manager resource;
   determining whether a remote proxy is requested by the application;
   if the remote proxy is requested, enabling use of the remote proxy for accessing a transaction coordinator;
   dynamically assigning another transaction manager resource to the application in response to a change in a plurality of conditions associated with the assigned transaction manager resource, the plurality of conditions comprising at least a status of a node in the clustered system, wherein the status of the node comprises a migration of the node from one cluster in the clustered system to another cluster in the clustered system, wherein the change in the plurality of conditions in the assigned transaction manager resource is transparent to the application;
   abstracting a transaction manager instance from the requesting application employing a common interface; and storing registry settings associated with each transaction manager in a separate registry key such that a plurality of transaction manager instances are enabled to be active on a node.

2. The method of claim 1, further comprising:
if a resource ID is not received along with the request, determining whether the request is from a known service; and
if the request is from a known service, extracting a resource identifier from a known services database that uniquely identifies the resource.

3. The method of claim 2, further comprising:
in response to one of receiving the resource ID along with the request and the resource identifier from the known services database, determining whether the resource is within a cluster group; and
enabling the use of the transaction manager resource if the resource is within the same cluster group.

4. The method of claim 3, further comprising:
if the requesting application and a transaction manager resource are not within the cluster group, determining whether a cluster default transaction manager resource exists; and
enabling the use of that default transaction manager resource if the default transaction manager resource exists.

5. The method of claim 4, further comprising:
if the default transaction manager resource does not exist, determining whether a local transaction manager resource is enabled; and
assigning the local transaction manager resource to the application requesting a transaction manager resource.

6. The method of claim 2, further comprising:
if the requested transaction manager resource is not a known service, determining whether a service-resource mapping exists; and
enabling use of a mapped resource if the mapping exists; else
enabling use of a cluster default transaction manager resource.

7. The method of claim 1, further comprising:
determining whether a local transaction manager resource is to be assigned to the application;
if the local transaction manager resource is to be assigned, determining whether the local transaction manager resource is enabled; and
if the local transaction manager resource is enabled, assigning the local transaction manager resource; else providing an error message to the requesting application.

8. The method of claim 1, wherein the transaction manager is assigned to the application based on at least one from a set of: an availability of each transaction manager resource, a load level of each transaction manager resource, a local transaction manager resource preference, a topology of the clustered system, and a resource manager configuration.

9. The method of claim 8, further comprising:
enabling an override of the transaction manager resource assignment.

10. The method of claim 1, wherein dynamically assigning another transaction manager resource to the application in response to a change in a plurality of conditions associated with the assigned transaction manager resource further comprises assigning the another transaction manager resource to the application in response to a change in at least one from a set of: an availability of each transaction manager resource, a load level of each transaction manager resource, a local transaction manager resource preference, a topology of the clustered system, a status of a cluster in the clustered system, a transaction manager configuration, and a resource manager configuration.

11. The method of claim 1, wherein the application is one of: a client application and a clustered system resource.

12. A system for providing virtualized transaction management in a clustered system, the system comprising:
a memory;
a processor coupled to the memory, wherein the processor is configured to execute instructions to perform actions including:
providing an operating system for a plurality of applications in a clustered system;
providing a plurality of transaction manager resources, wherein at least one cluster of the clustered system includes multiple transaction manager resources;
providing a transaction manager virtualization layer that is arranged to:
assign a transaction manager resource to an application requesting a transaction manager resource;
determine the requested transaction manager resource;
enable use of the requested transaction manager resource by the application when providing transaction management services through the assigned transaction manager resource;
determine whether a remote proxy is requested by the application;
if the remote proxy is requested, enabling use of the remote proxy
for accessing a transaction coordinator;
dynamically assign another transaction manager resource to the application in response to a change in a plurality of conditions associated with the assigned transaction manager resource, the plurality of conditions comprising at least a status of a node in the clustered system, wherein the status of the node comprises a migration of the node from one cluster in the clustered system to another cluster in the clustered system, wherein the change in the plurality of conditions in the assigned transaction manager resource is transparent to the application;
abstract a transaction manager instance from the requesting application employing a common interface; and
store registry settings associated with each transaction manager in a separate registry key such that a plurality of transaction manager instances are enabled to be active on a node.

13. The system of claim 12, wherein the transaction manager virtualization layer is an integral component of the operating system, and wherein the transaction manager virtualization layer is further arranged to enable multiple instances of a transaction manager resource within a cluster.

14. The system of claim 12, wherein the transaction manager virtualization layer is further arranged to select a transaction manager resource for the requesting application employing a heuristic algorithm based on at least on from a set of: an availability of each transaction manager resource, a load level of each transaction manager resource, a local transaction manager resource preference, a topology of the clustered system, and a resource manager configuration.

15. The system of claim 12, wherein the transaction manager virtualization layer is further arranged to reassign a transaction manager resource to the requesting application in response to the requesting application, the assigned transaction manager resource, and a resource manager.

16. A computer-readable memory storage device with instructions stored thereon for providing virtualized transaction management in a clustered system, the instructions comprising:

receiving a request for a transaction manager resource from one of an application and a resource;

assigning the application a transaction manager resource based on one of: whether a resource ID is received with the request, whether the request is from a known service resource, whether a local transaction manager resource is requested, and whether a default transaction manager resource exists in a cluster that includes one of the requesting application and the requesting resource, wherein the cluster includes a plurality of transaction manager resources;

determining the requested transaction manager resource;

enabling use of the requested transaction manager resource by one of the requesting application and the requesting resource while providing transaction management services through the assigned transaction manager resource;

determining whether a remote proxy is requested by the application;

if the remote proxy is requested, enabling use of the remote proxy for accessing a transaction coordinator;

dynamically assigning another transaction manager resource to the application in response to a change in a plurality of conditions associated with the assigned transaction manager resource, the plurality of conditions comprising an availability of each transaction manager resource, a load level of each transaction manager resource, a local transaction manager resource preference, a topology of the clustered system, a status of a cluster in the clustered system, a status of a node in the clustered system, a transaction manager configuration, and a resource manager configuration, wherein the status of the node comprises the node going offline due to a software upgrade in the clustered system, wherein the change in the plurality of conditions in the assigned transaction manager resource is transparent to the application;

abstracting a transaction manager instance from the requesting application employing a common interface; and storing registry settings associated with each transaction manager in a separate registry key such that a plurality of transaction manager instances are enabled to be active on a node.

17. The computer-readable memory storage device of claim 16, wherein the instructions further comprise:

if the request is not from a known service and a resource ID has not been received with the request, determining whether a service-resource mapping exists; and enabling use of a mapped resource if the mapping exists; else enabling use of a cluster default transaction manager resource.

* * * * *